April 14, 1942.  S. B. BEUGLER  2,279,437

HOSE CONNECTOR

Filed June 19, 1940

Inventor
Samuel B. Beugler.

Attorneys.

Patented Apr. 14, 1942

2,279,437

UNITED STATES PATENT OFFICE 2,279,437

HOSE CONNECTOR

Samuel B. Beugler, Los Angeles, Calif.

Application June 19, 1940, Serial No. 341,297

2 Claims. (Cl. 285—84)

This invention has reference to hose couplings, and particularly to contractile ferrules for compressibly engaging a hose end and for securing a connector or coupling member within the hose.

For the purpose of securing a coupling member within the end of a hose it has been past common practice to insert the coupling member within the hose end, and then to apply a contractive clamp or contractive ferrule around the end portion of the hose to compress the hose about the inserted coupling member. These clamps and contractile ferrules have been of various kinds. Clamps with multiple parts have been bolted or otherwise secured around the hose. Wire or similar bindings have been used, and solid contractile ferrules have been used. In both the latter types the compressing and clamping action and function depend upon the tensile strength or resistance of the metal of the binding or ferrule. And in the solid ferrule type, which is contracted and compressed about the hose by a drawing or similar operation, contraction of the ferrule not only necessitates the use of highly specialized tools or machinery but also necessarily results in elongation of the ferrule as a result of its diametral compression. Such elongation of the ferrule, in forcible and clamping contact with the hose, necessarily elongates and stretches the hose and may result in its injury and finally result in premature rupture of the hose at the end, or just inside the end, of the ferrule.

My invention provides a simple, highly effective, and easily contracted hose clamping and coupling retaining ferrule which requires no highly specialized tools for its contraction, which depends for its hose compressing and clamping function on the bending strength or resistance of the metal of the ferrule, and which has no action of elongation when compressed radially. In substance, the invention comprises a ferrule designed with a more or less cylindric body portion and a coupling engaging flange at one end. The whole ferrule, including the flange, is slotted through on one side only. The whole ferrule is composed of a comparatively non-elastic and deformable metal—that is, a comparatively soft rather than a hard metal—such as ordinary die-cast metal or soft brass. Having low elasticity the ferrule when contracted by bending will maintain its contracted shape; and the thickness of the ferrule is such that when contractively bent tightly around the hose and the hose compressed by the ferrule, the ferrule will then of itself hold the members compressed and tightly clamped by reason of the bending strength or resistance of the ferrule.

In its original form before being compressed the ferrule slot is wide enough that, when closed or substantially closed by compression, the ferrule will then grip and compress the hose and also engage the coupling so as to lock it against longitudinal movement. During the compressing bending action the ferrule is changed only in diameter. The compressing action is one of bending the ferrule circumferentially rather than one of compressing it in length, and thus there is no attendant change of length of the ferrule such as necessarily there is when a solid ferrule is compressed in diameter.

The accompanying drawing shows typical forms illustrative of my invention. In the drawing.

Figure 1A:
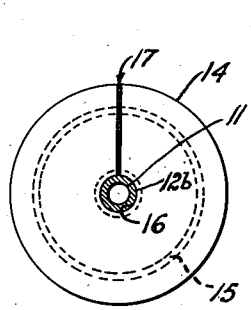
Fig. 1a is a section on line 1a—1a of Fig. 1.

In the drawing a hose is shown at 10 and a coupling member is more or less diagrammatically shown at 11. This coupling member, here shown merely as tubular, may be of any form desired and provided with any desired coupling means, such as screw-threads, etc. Typically such a coupling member 11 will have a hose engaging portion provided with peripheral beads or teeth or the like, such as indicated at 12, for engaging the inner wall of the hose. As here shown, one of these peripheral beads 12a forms a shoulder outside of which the flange 13 of my improved ferrule may engage, to prevent outward longitudinal movement of the coupling member. Or, as is most commonly the case in coupling members now in use, the external form of the coupling member will be such as to provide a groove, such as illustratively indicated at 12b, in which the inner edge of the ferrule flange 13 may engage to solidly lock the coupling member against longitudinal movement. The particular structure of the coupling member is, however, no part of the present invention, it only being desirable that the coupling member present a shoulder or a groove against or in which the ferrule flange may engage when contracted.

Figure 1:
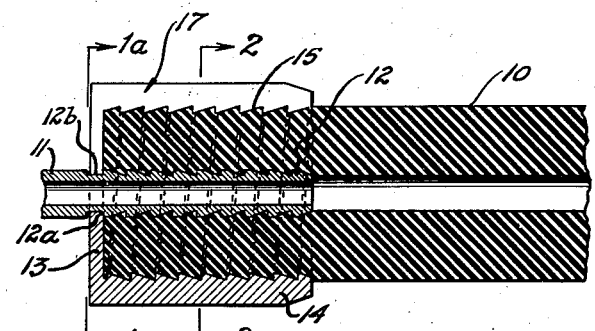
Fig. 1 is a central longitudinal section showing a preferred form of my invention applied to a hose and a coupling member.
Figure 2:
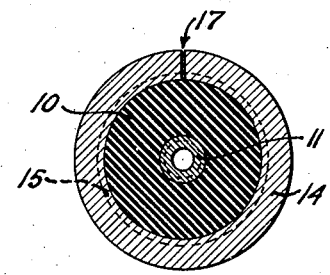
Fig. 2 is a transverse section on line 2—2 of Fig. 1.
Figure 3:
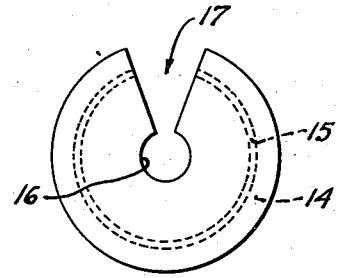
Fig. 3 is an end view of the uncompressed ferrule.

The ferrule itself is constructed with a substantially cylindric body portion 14 having circumferential grooves or teeth 15 on its inner surface to grip the hose. The form of these grooves or teeth may vary as desired. At one end the ferrule is provided with the inwardly projecting flange 13 whose inner edge 16 is adapted to be snugly contracted around the coupling 11. A comparatively wide slot 17, lying generally in a radial and longitudinal plane, extends through the whole ferrule, both ferrule body and flange, at one side only. As originally manufactured, and before application to the hose, the ferrule is in the expanded condition shown in Fig. 3, slot 17 being open sufficiently widely that the ferrule may be easily slipped over the end of a hose of the size for which it is intended. Also, in this original expanded condition, the expanded central opening 16 is large enough to slip over the inner end (right hand end in Fig. 1) of the coupler nipple or over any shoulder, such as 12a, on the nipple. This is necessary as the outer end of the coupler usually has an enlarged head of some sort. It will be understood that the form of the coupler and its nipple may be varied; my contractible ferrule will coact with any form of coupler which has a suitable engagement shoulder.

The whole ferrule is composed integrally of some suitable comparatively soft and deformable metal of relatively low elasticity. Ordinary die-cast metal, or ordinary medium soft brass, or cast brass, are instances of suitable metals for the purpose. To apply the ferrule and to secure a coupling member in the hose, the ferrule and coupling are applied to the hose in the relative positions shown in Fig. 1, and the ferrule is then compressed in diameter by bending it about the hose until the hose is tightly gripped and the inner edge 16 of flange 13 is snugly compressed about the coupling or is compressed into engagement with the groove 12b or the shoulder 12a. The ferrule is preferably so designed in relative dimensions that, when it is sufficiently tightly compressed about the hose, the slot 17 will be closed or nearly closed, preferably. Some variation is allowable in the amount of compression given the hose and in the width of the closed-down slot; and these permissible variations adapt any given ferrule to substantial variations of hose diameter.

Using such materials as have been designated, the wall of ferrule body 14 is made of sufficient thickness that, when the ferrule is forcibly bent and set in its contracted hose compressing condition, the bending strength or resistance of the compressed ferrule wall is then great enough that the ferrule will, of itself, hold the hose compressed, and thus maintain a tight grip on the hose and compress it tightly about the coupling member. As an illustration of comparative dimensions suitable for the purpose, but without limitation, I may say that for a hose of approximately ⅝" external diameter, I find that a ferrule approximately ¾" long and with a wall approximately 3/32" thick, of ordinary die-cast material, has sufficient bending strength to hold a thick walled hose properly compressed about the coupling member.

Because the ferrule is compressed only in diameter or radius by being bent circumferentially, it is of course not elongated during the compressing operation, and as a result there is no tendency to stretch or otherwise injure the hose during the clamping operation. And the fact that the ferrule is contracted solely by circumferential bending also lends itself to a simple and easily performed operation of contraction. In fact, no special tools are at all necessary for the purpose. The ferrule can be contracted by careful hammering or by the use of a vise or a heavy pair of pliers. It is preferred however to use a tool composed essentially of two blocks, having opposite semi-circular recesses of a diameter equal to that of the contracted ferrule. Such blocks can be used in an ordinary vise, or can be incorporated in a pair of tongs or pliers.

Figure 4:
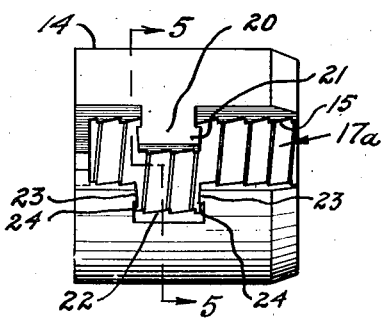
Fig. 4 is a side elevation of a modified ferrule structure.
Figure 5:
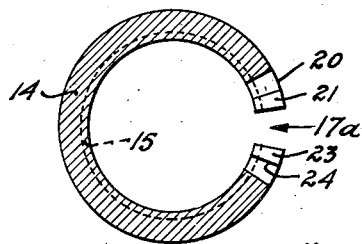
Fig. 5 is a transverse section on line 5—5 of Fig. 4.

Figs. 4 and 5 show a modified form, similar in all particulars to the simple form previously described, but having in addition a locking or hooking arrangement for positively locking the ferrule in compressed condition about the hose. One side of the gap 17a is provided with a headed lug 20, here shown illustratively as having a T-head 21. The other side of gap 17a has a substantially correspondingly shaped recess 22 whose entrance walls 23 are somewhat flared so that head 21 can be squeezed through the entrance and then be held in place by shoulders 24. The lock, so constituted, prevents any liability of the compressed ferrule being opened or loosened by accident or rough handling.

I claim:

1. A compression ferrule for a hose connector which has a tubular stem insertible in the hose end, said ferrule consisting exclusively of a hollow cylindric body wall with an inwardly extending stem engaging flange at one end, the wall and flange being slotted through at one side only so as to allow the ferrule wall to be radially compressed by circumferential bending into compressing engagement with the hose and the flange to be compressed into engagement with the stem, the wall and flange being composed of relatively non-elastic, deformable metal and of such thickness as to inherently retain their bent set against the expansive forces of the compressed hose.

2. A compression ferrule for a hose connector which has a tubular stem insertible in the hose end, said ferrule comprising a hollow cylindric body wall with an inwardly extending stem engaging flange at one end, the wall and flange being slotted through at one side only so as to allow the ferrule wall to be radially compressed by circumferential bending into compressing engagement with the hose and the flange to be compressed into engagement with the stem, the wall and flange being composed of relatively non-elastic, deformable metal and of such thickness as to retain their bent set against the expansive forces of the compressed hose; and the opposing slot edges of the ferrule wall having respectively a shouldered recess and a complementary headed lug adapted to be forced into the recess to lock the ferrule in compressed condition.

SAMUEL B. BEUGLER.